US009924349B2

(12) United States Patent
Wu (10) Patent No.: US 9,924,349 B2
(45) Date of Patent: Mar. 20, 2018

(54) METHOD, DEVICE, AND SYSTEM FOR DYNAMICALLY BINDING A MACHINE CARD (71) Applicant: ZTE CORPORATION, Shenzhen, Guangdong Province (CN)

(72) Inventor: Chuanxi Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/313,835

(22) PCT Filed: Jul. 11, 2014

(86) PCT No.: PCT/CN2014/082090
§ 371 (c)(1),
(2) Date: Nov. 23, 2016

(87) PCT Pub. No.: WO2015/180242
PCT Pub. Date: Dec. 3, 2015

(65) Prior Publication Data
US 2017/0245139 A1 Aug. 24, 2017

(30) Foreign Application Priority Data

May 27, 2014 (CN) .......................... 2014 1 0228118

(51) Int. Cl.
*H04B 1/38* (2015.01)
*H04W 8/20* (2009.01)
(Continued)

(52) U.S. Cl.
CPC .......... *H04W 8/205* (2013.01); *H04B 1/3816* (2013.01); *H04W 8/22* (2013.01)

(58) Field of Classification Search
CPC ....... H04B 1/3816; H04W 8/205; H04W 8/22
See application file for complete search history.

(56) References Cited

U.S. PATENT DOCUMENTS

2005/0020308 A1   1/2005   Lai

FOREIGN PATENT DOCUMENTS

| CN | 101072403 A | 11/2007 |
| CN | 101141718 A | 3/2008 |

(Continued)

OTHER PUBLICATIONS

International Search Report and Written Opinion dated Mar. 3, 2015 for PCT Application No. PCT/CN2014/082090.

(Continued)

*Primary Examiner* — Xin Jia
(74) *Attorney, Agent, or Firm* — Plumsea Law Group, LLC (57) ABSTRACT A machine-card dynamic binding method is provided. An SIM card is provided with a first basic file and a second basic file, sets a PIN to be in a blocked status in an initialization process, indicates that an SIM service table supports an additional terminal profile to a terminal, receives a profile download instruction, sends a proactive PROVIDE LOCAL INFORMATION command to the terminal after determining that the terminal supports PROVIDE LOCAL INFORMATION command, receives a terminal response including an IMEI number of the terminal, matches the IMEI number with an IMEI number in the first basic file, determines that a binding check succeeds if matching succeeds, sets a status flag of a binding check success into the second basic file, and sets PIN to be in an unlocked status and a disable status after SIM card initialization is completed. A machine-card dynamic binding device and system are further provided.

16 Claims, 4 Drawing Sheets

(51) Int. Cl.
*H04W 8/22* (2009.01)
*H04B 1/3816* (2015.01)

(56) References Cited

FOREIGN PATENT DOCUMENTS

| CN | 101472000 A | 7/2009 |
|---|---|---|
| CN | 102263846 A | 11/2011 |
| CN | 102833068 A | 12/2012 |

OTHER PUBLICATIONS

Extended European Search Report dated May 22, 2017 for European Patent Application No. 14893479.7.

"3rd Generation Partnership Project; Technical Specification Group Services and System Aspects; Study on security aspects of Machine-Type Communications (MTC) and other mobile data applications communications enhancements (Release 12)", 3GPP Standard; 3GPP TR 33.868, 3GPP, Mobile Competence Centre; 650, Route Des Lucioles; F-06921 Sophia-Antipolis Cedex; France, vol. SA WG3, V12.0.0, Mar. 17, 2014, pp. 1-119, XP050769899.

Gemalto et al: "USAT Application Pairing EF pairing", 3GPP Draft; C6-140260 USAT Application Pairing EF Pairing, 3rd Generation Partnership Project (3GPP), Mobile Competence Centre; 650, Route Des Lucioles; F-06921 Sophia-Antipolis Cedex; France, vol. CT WG6, No. Phoenix; May 19, 2014, retrieved from the internet: url:http://www.3gpp.org/ftp/Meetings_3GPP_SYNC/CT6/Docs/.

"3rd Generation Partnership Project; Technical Specification Group Services and System Aspects; Security aspects of Machine-Type Communications (MTC) and other mobile data applications communications enhancements (Release 12)", 3GPP Standard; 3GPP TS 33.187, 3GPP, Mobile Competence Centre; 650, Route Des Lucioles; F-06921 Sophia-Antipolis Cedex; France, vol. SA WG3, No. V12.0.0, Mar. 17, 2014, pp. 1-11, XP050769897.

FIG. 6

METHOD, DEVICE, AND SYSTEM FOR DYNAMICALLY BINDING A MACHINE CARD

CROSS-REFERENCE TO RELATED APPLICATION(S)

This application is the U.S. National Phase application of PCT application number PCT/CN2014/082090 having a PCT filing date of Jul. 11, 2014, which claims priority of Chinese patent application 201410228118.X filed on May 27, 2014, the disclosures of which are hereby incorporated by reference.

TECHNICAL FIELD

The present document relates to a terminal communication technology, in particular to a machine-card dynamic binding method, device and system.

BACKGROUND OF RELATED ART

As an important part of emerging high-tech industries, Internet of Things TOT has already been considered by all countries in the world as one of key technologies for coping with economic crisis and reviving the economy. TOT services may be widely applied to numerous industries, including vehicles, power, finance, environmental protection, petroleum, personal and enterprise security, hydrology, military, fire fighting, meteorology, coal, agriculture and forestry, elevators, etc. It is predicted that TOT services will quickly enter many industries in several future years and the number of users thereof will quickly increase. It is predicted that, to the end of 2015, the scale of the TOT industry in China will reach 750 billion Yuan. TOT application will become one of core applications of Long Term Evolution LTE and 5G communication technologies after a few years, and the development prospect of the TOT application is wide. In application types of TOT services at present, some applications require terminals to only use SIM cards in a designated range, some applications require SIM cards to be arranged at designated terminals, some applications require that terminals in a designated range may be paired with SIM cards with designated identifications, and all of those involve a matter of binding between terminals and SIM cards. At present, there are many binding solutions in the market. Relatively mainstream solutions, for example, include the following solutions. First, a network-side identification solution, in which an Equipment Identity Register EIR needs to be newly added onto a terminal, EIRs are arranged into white, black and grey tables according to International Mobile Equipment Identity IMEI information. In a network interaction process of the terminal, a Mobile Switching Center MSC or a Visitor Location Register VLR requests the terminal for an IMEI and sends the IMEI to the EIR, and the EIR compares the received IMEI with the white, black and grey tables and sends a result to the MSC or the VLR, such that the MSC or the VLR decides whether to allow the terminal to enter a network. This mode needs additional equipment investment at a network side and there is a signaling interaction operation with the network, therefore the channel occupation of an air interface is increased invisibly and the implementation process is relatively complex. Second, a terminal active identification solution is widely used at present. Common card blocking, network blocking and machine-card binding mainly have the following several types: grid blocking, subnet blocking, operator blocking, cooperator binding, etc. For example, China patent application No. 200710106103.6 titled Method and Device for Implementing Binding and Unbinding between Terminal and SIM card is a representative of the implementation solution. The essence of this type of solution is substantively similar, i.e., a corresponding authentication code is developed on a terminal, information of a designated file of a Subscriber Identity Module SIM/Universal Subscriber Identity Module USIM card is read through interaction with the SIM/USIM card, and the information is compared with the authentication code on the terminal, and thereby blocking or binding between the SIM/USIM card and the terminal is implemented. Although the implementation of solution 2 is simpler than the implementation of solution 1, corresponding unblocking (unbinding) and blocking (binding) operations need to be performed on the terminal and the solution 2 is very troublesome to use. Once blocking (binding) is implemented, as a result, the user will be unable to use the terminal under other operator networks, and consequently very poor user experience and resource waste are caused. In addition, with the development of the IOT technology, the existing machine-card binding technology is far from satisfying requirements of binding and blocking between M2M devices and SIM cards of IOT. Many IOT applications have increasingly high requirements for security of binding between terminals and SIM cards.

SUMMARY

In order to solve the technical problems existing in the prior art, the embodiments of the present document provide a machine-card dynamic binding method, device and system.

An embodiment of the present document provides a machine-card dynamic binding method. The method includes:

providing a first basic file and a second basic file on a Subscriber Identification Module SIM card, herein the first basic file is used for pre-storing an International Mobile Equipment Identity IMEI number/numbers of one or a group of terminals, and the second basic file is used for storing a status flag of a binding check result;

the SIM card setting a Personal Identification Number PIN to be in a blocked status in an initialization process, indicating that an SIM service table supports an additional terminal profile to a terminal, and receiving a profile download instruction;

the SIM card sending a proactive PROVIDE LOCAL INFORMATION command to the terminal after determining that the terminal supports the PROVIDE LOCAL INFORMATION command, and receiving a terminal response including an IMEI number of the terminal; and the SIM card matching the IMEI number with the IMEI number in the first basic file, and determining that a binding check succeeds if matching succeeds, and setting a status flag of a binding check success into the second basic file, and setting the PIN to be in an unlocked status and a disable status after SIM card initialization is completed.

In the above-mentioned solution, the PROVIDE LOCAL INFORMATION command is used as a part of an SIM initialization code.

In the above-mentioned solution, said sending a proactive PROVIDE LOCAL INFORMATION command to the terminal includes: performing the sending of the proactive PROVIDE LOCAL INFORMATION command through an application program, herein the application program is pre-embedded into the SIM card and used as a code of an operating system in the SIM card.

In the above-mentioned solution, the SIM card matching the IMEI number with the IMEI number in the first basic file includes: performing the matching between the IMEI number of the terminal and the IMEI number in the first basic file through a script file.

In the above-mentioned solution, the script file is pre-embedded into the SIM card and used as a code of an operating system in the SIM card.

In the above-mentioned solution, the method further includes: the SIM card accepting dynamic management performed by a management platform on the first basic file through an OTA mechanism.

In the above-mentioned solution, the method further includes: the SIM card providing reading of the status flag of the binding check result in the second basic file for background personnel through an OTA mechanism.

In the above-mentioned solution, the method further includes: when the SIM card and the terminal perform an OTA interaction, the terminal determining that a data change occurs in the first basic file, performing restart and reset operations of the terminal, the SIM card performing initialization again after the restart of the terminal, and performing a binding check of the SIM card and the terminal in an initialization process.

In the above-mentioned solution, the method further includes: when a data change occurs in the first basic file, the SIM card sending a proactive REFRESH command to the terminal, selecting an SIM card initialization mode, triggering resetting of the SIM card, performing initialization again after the refresh of the terminal, and performing a binding check of the SIM card and the terminal in an initialization process.

The embodiment of the present document provides a machine-card dynamic binding method, including:

a terminal receiving an indication that an SIM service table supports an additional terminal profile, sent by an SIM card, and returning a profile download instruction; and the terminal receiving a proactive PROVIDE LOCAL INFORMATION command sent by the SIM card, and sending a terminal response including an IMEI number of the terminal to the SIM card.

In the above-mentioned solution, the method further includes: when the SIM card and the terminal perform an OTA interaction, the terminal determining that a data change occurs in a first basic file of the SIM card, and performing restart and reset operations of the terminal; and the SIM card is provided with the first basic file and a second basic file, herein the first basic file is used for pre-storing an IMEI number/numbers of one or a group of terminals, and the second basic file is used for storing a status flag of a binding check result.

In the above-mentioned solution, the method further includes: when the terminal receives a proactive REFRESH command sent by the SIM card, performing a refresh operation and triggering resetting of the SIM card.

The embodiment of the present document provides a machine-card dynamic binding method, including:

providing a first basic file and a second basic file on an SIM card, herein the first basic file is used for pre-storing an IMEI number/numbers of one or a group of terminals, and the second basic file is used for storing a status flag of a binding check result;

the SIM card setting a PIN to be in a blocked status, sent by an SIM card, and indicating that an SIM service table supports an additional terminal profile to a terminal;

the terminal receiving an indication that the SIM service table supports the additional terminal profile, sent by an SIM card, and returning a profile download instruction;

the SIM card receiving the profile download instruction, and sending a proactive PROVIDE LOCAL INFORMATION command to the terminal after determining that the terminal supports the PROVIDE LOCAL INFORMATION command;

the terminal receiving the proactive PROVIDE LOCAL INFORMATION command sent by the SIM card, and sending a terminal response including an IMEI number of the terminal to the SIM card; and the SIM card matching the IMEI number of the terminal with the IMEI number in the first basic file, and determining that a binding check succeeds when matching succeeds, and setting a status flag of a binding check success into the second basic file, and setting the PIN to be in an unblocked status and a disable status after SIM card initialization is completed.

The embodiment of the present document provides an SIM card provided with a first basic file and a second basic file, herein the first basic file is used for pre-storing an IMEI number/numbers of one or a group of terminals, and the second basic file is used for storing a status flag of a binding check result;

the SIM card further including: a PIN status module, a receiving/sending module and a matching module, herein, the PIN status module is arranged to, in an initialization process, set a PIN to be in a blocked status, and inform the receiving/sending module and set the PIN in an unblocked status and a disable status when determining that a binding check succeeds and initialization is completed;

the receiving/sending module is arranged to indicate that an SIM service table supports an additional terminal profile to a terminal, and receive a profile download instruction, and send a proactive PROVIDE LOCAL INFORMATION command to the terminal after determining that the terminal supports the PROVIDE LOCAL INFORMATION command; and the matching module is arranged to receive a terminal response including an IMEI number of the terminal, and match the IMEI number of the terminal with the IMEI number in the first basic file, and determine that the binding check succeeds when matching succeeds, and set a status flag of a binding check success into the second basic file, and inform the PIN status module after the initialization is completed.

In the above-mentioned solution, the PROVIDE LOCAL INFORMATION command is used as a part of an SIM initialization code.

In the above-mentioned solution, the receiving/sending module is specifically arranged to perform the sending of the PROVIDE LOCAL INFORMATION command through an application program, herein the application program is pre-embedded into the SIM card and used as a code of an operating system in the SIM card.

In the above-mentioned solution, the matching module is specifically arranged to perform the matching between the IMEI number of the terminal and the IMEI number in the first basic file through a script file.

In the above-mentioned solution, the SIM card further includes: a dynamic management module arranged to accept dynamic management performed by a management platform on the first basic file through an OTA mechanism.

In the above-mentioned solution, the dynamic management module is further arranged to provide reading of the status flag of the binding check result in the second basic file for background personnel through the OTA mechanism.

In the above-mentioned solution, the SIM card further includes: a rebinding module arranged to inform the PIN status module after the restart of the terminal; or when a data change occurs in the first basic file, send a proactive REFRESH command to the terminal, select an SIM card initialization mode, trigger resetting of the SIM card and inform the PIN status module after the refresh of the terminal.

The embodiment of the present document provides a terminal, including: a profile download instruction providing module and an IMEI number providing module, herein, the profile download instruction providing module is arranged to receive an indication that an SIM service table supports an additional terminal profile, sent by an SIM card, and return a profile download instruction; and the IMEI number providing module is arranged to receive a proactive PROVIDE LOCAL INFORMATION command sent by the SIM card, and send a terminal response including an IMEI number of the terminal to the SIM card.

In the above-mentioned solution, the terminal further includes: a restart module arranged to determine that a data change occurs in a first basic file of the SIM card, and perform restart and reset operations of the terminal; and the SIM card is provided with the first basic file and a second basic file, herein the first basic file is used for pre-storing an IMEI number/numbers of one or a group of terminals, and the second basic file is used for storing a status flag of a binding check result.

In the above-mentioned solution, the terminal further includes: a refresh module arranged to, when receiving a proactive REFRESH command sent by the SIM card, perform a refresh operation and trigger resetting of the SIM card.

The embodiment of the present document provides a machine-card dynamic binding system, including an SIM card and a terminal, herein the SIM card is provided with a first basic file and a second basic file, herein the first basic file is used for pre-storing an IMEI number/numbers of one or a group of terminals, and the second basic file is used for storing a status flag of a binding check result;

the SIM card is arranged to, in an initialization process, set a PIN to be in a blocked status, indicate that an SIM service table supports an additional terminal profile to a terminal, receive a profile download instruction, send a proactive PROVIDE LOCAL INFORMATION command to the terminal after determining that the terminal supports the PROVIDE LOCAL INFORMATION command, receive a terminal response including an IMEI number of the terminal, match the IMEI number of the terminal with the IMEI number in the first basic file, determine that a binding check succeeds when matching succeeds, set a status flag of a binding check success into the second basic file, and set the PIN to be in an unblocked status and a disable status after SIM card initialization is completed; and the terminal is arranged to receive an indication that the SIM service table supports the additional terminal profile, sent by an SIM card, and return the profile download instruction; and receive the proactive PROVIDE LOCAL INFORMATION command sent by the SIM card, and send the terminal response including the IMEI number of the terminal to the SIM card.

According to the machine-card dynamic binding method, device and system provided by the embodiments of the present document, an SIM card is provided with a first basic file and a second basic file, herein the first basic file is used for pre-storing an IMEI number/numbers of one or a group of terminals, and the second basic file is used for storing a status flag of a binding check result. In an initialization process, the SIM card sets a Personal Identification Number PIN to be in a blocked status, indicates a terminal about that an SIM service table supports an additional terminal profile, receives a profile download instruction, sends a proactive PROVIDE LOCAL INFORMATION command to the terminal after determining that the terminal supports the PROVIDE LOCAL INFORMATION command, receives a terminal response including an IMEI number of the terminal, matches the IMEI number with the IMEI number in the first basic file, determines that a binding check succeeds if matching succeeds, sets a status flag of a binding check success into the second basic file, and sets the PIN to be in an unlocked status and a disable status after SIM card initialization is completed. Thereby, the SIM card can be actively bound to the terminal. The machine-card dynamic binding method provided by the embodiment of the present document is simple to operate and easy to implement, and can satisfy the requirements for safety of binding between terminals and SIM cards under an IOT environment.

SPECIFIC EMBODIMENTS

Sim Application Toolkit STK technology adds a new capability of active operation to an SIM card on the basis of the existing passive operation mode of the SIM card. The STK technology allows applications in the SIM card to interact with a terminal which supports the applications, i.e., the STK technology supporting an active session between the SIM card and the terminal, such that a mobile user has a personalized additional service. According to the latest version of the 3GPP, 3GPP TS 11.14 V8.18.0 (issued in June, 2007), proactive commands which are supported by SIM cards include various commands, such as PROVIDE LOCAL INFORMATION, DISPLAY TEXT, REFRESH, SEND SHORT MESSAGE and SET UP CALL and so on.

Herein, the PROVIDE LOCAL INFORMATION command requires the terminal to provide some parameters thereof, such as Mobile Country Code MCC, Mobile Network Code MNC, Location Area Code LAC/Tracking Area Code TAC, cell ID of a current serving cell and IMEI of the terminal and so on.

In the embodiments of the present document, an SIM card is provided with a first basic file and a second basic file.

Herein, the first basic file is used for pre-storing an IMEI number/numbers of one or a group of terminals, and the second basic file is used for storing a status flag of a binding check result. In an initialization process, the SIM card sets a PIN to be in a blocked status, indicates to a terminal that an SIM service table supports an additional terminal profile, and receives a profile download instruction. The SIM card sends a proactive PROVIDE LOCAL INFORMATION command to the terminal after determining that the terminal supports the PROVIDE LOCAL INFORMATION command, and receives a terminal response including an IMEI number of the terminal. The SIM card matches the IMEI number with the IMEI number in the first basic file, and determines that a binding check succeeds if matching succeeds, and sets a status flag of a binding check success into the second basic file. The SIM card sets the PIN to be in an unlocked status and a disable status after SIM card initialization is completed. Here, the SIM card generally refers to an SIM card which can use the STK technology and is used for a GSM network, or an R-UIM card which can use the STK technology and is used for a CDMA network, or other smart cards which can use the STK technology and are judged by professionals to be capable of being used as SIM cards. The terminal may be Mobile Equipment ME or Internet of Things IOT equipment which can use the SIM card.

The present document will be further described below in detail with the drawings and the specific embodiments.

Figure 1:
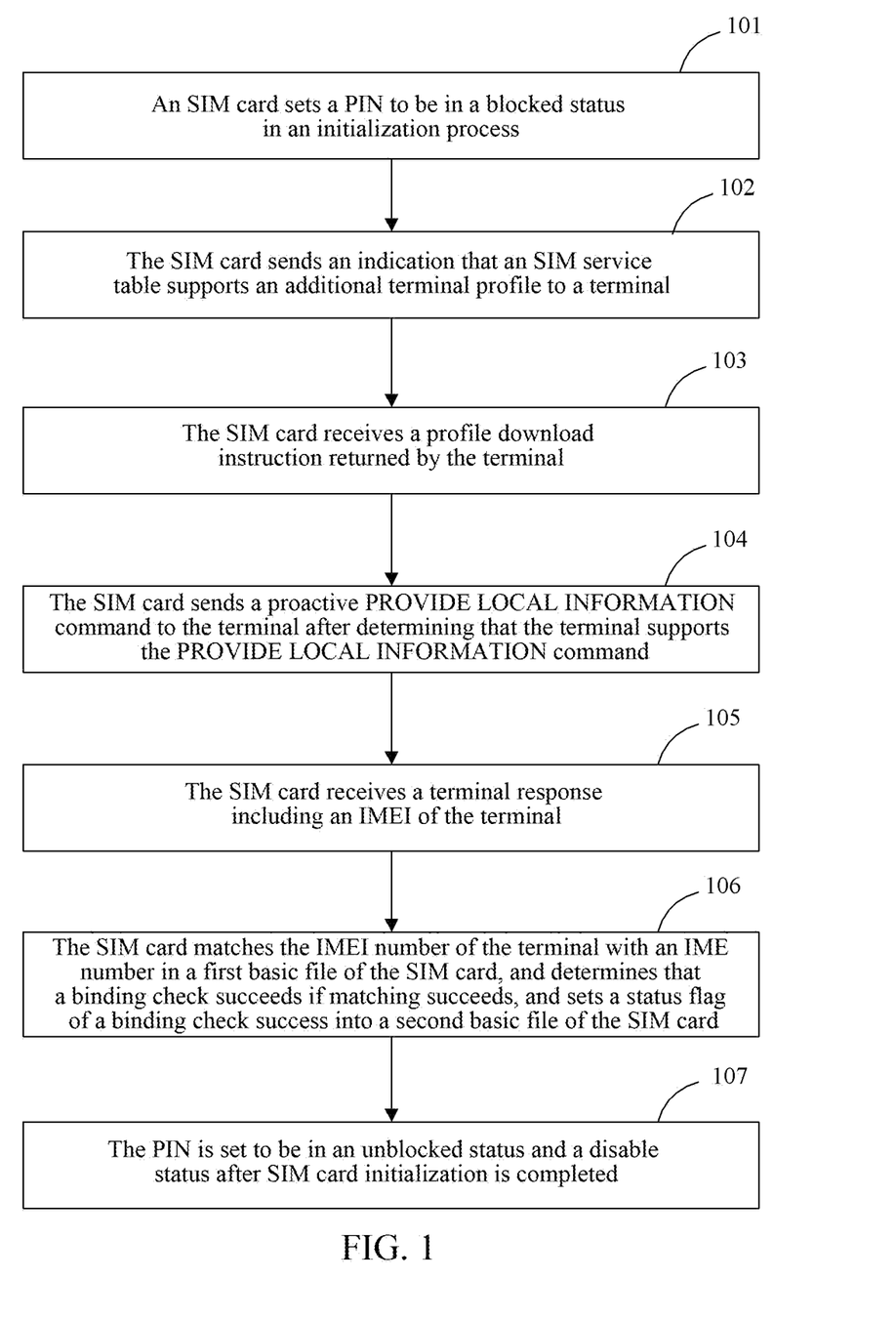
FIG. 1 illustrates a flowchart of a machine-card dynamic binding method implemented by embodiment one of the present document.

Embodiment one of the present document implements a machine-card dynamic binding method. As illustrated in FIG. 1, the method includes the following steps.

In step 101, an SIM card sets a PIN to be in a blocked status in an initialization process.

In step 102, the SIM card sends an indication that an SIM service table supports an additional terminal profile to a terminal.

In step 103, the SIM card receives a profile download instruction returned by the terminal.

In step 104, the SIM card sends a proactive PROVIDE LOCAL INFORMATION command to the terminal after determining that the terminal supports the PROVIDE LOCAL INFORMATION command.

Here, the PROVIDE LOCAL INFORMATION command may be used as a part of an SIM initialization code. The operation of sending the proactive PROVIDE LOCAL INFORMATION command to the terminal includes: the sending of the proactive PROVIDE LOCAL INFORMATION command is performed through an application program, herein the application program is pre-embedded into the SIM card and may be used as a code of an operating system in the SIM card (i.e., Chip Operating System, COS).

In step 105, the SIM card receives a terminal response including an IMEI of the terminal.

In step 106, the SIM card matches the IMEI number of the terminal with an IME number in a first basic file of the SIM card, and determines that a binding check succeeds if matching succeeds, and sets a status flag of a binding check success into a second basic file of the SIM card.

Specifically, the SIM card is provided in advance with a first basic file and a second basic file. Herein, the first basic file is used for pre-storing an IMEI number/numbers of one or a group of terminals, a read permission of the first basic file is set to be ALWAYS and other permissions are set to be NEVER. The second basic file is used for storing a status flag of a binding check result, the status flag of the binding check result may be a status flag of the binding check result of the SIM card and the terminal at the most recent time, and may also be status flags of binding check results of the SIM card and the terminal at the recent N times, N is an integer greater than 1. A read permission of the second basic file is set to be ALWAYS, other permissions are set to be NEVER. Besides, the second basic file may also store the IMEI number of the terminal corresponding to the status flag.

The matching between the IMEI number of the terminal and the IMEI number in the first basic file is performed through a script file. The status flag of the binding check success is set into the second basic file for storage when matching succeeds. The script file is pre-embedded into the SIM card and may be used as a code of the operating system in the SIM card (i.e., Chip Operating System, COS), and the code has extendibility.

In step 107, the PIN is set to be in an unblocked status and a disable status after the initialization of the SIM card is completed.

In this embodiment, step 104 further includes the following operation. When the SIM card determines that the terminal does not support the PROVIDE LOCAL INFORMATION command, it is determined that the binding check fails, and the steps after step 104 are not executed any longer.

Step 106 further includes the following operation. When the IMEI number of the terminal is not matched with the IMEI number allowed by the SIM card, it is determined that the binding check fails, and the step after step 106 is not executed any longer. Specifically, when the matching between the IMEI number of the terminal and the IMEI number in the first basic file does not succeed, a status flag of a binding check failure is set into the second basic file for storage.

In the method provided by this embodiment, the SIM card may also accept dynamic management performed by a management platform on the first basic file through an OTA (over the AT interface) mechanism. The dynamic management includes operations such as an addition operation, a deletion operation and a range change operation are performed on the IMEI numbers stored in the first basic file to implement dynamic binding between the terminal and the SIM. Here, the management platform may be a group of servers.

In addition, the SIM card may provide readings of the status flag of the binding check result in the second basic file for background personnel through the OTA mechanism such that the background personnel maintains a binding relationship between the SIM card and the terminal.

The method provided by this embodiment further includes the following operations. When the SIM card and the terminal perform an OTA interaction, the terminal judges whether a data change occurs in the first basic file. If the data change occurs, restart and reset operations of the terminal are performed, and the SIM card performs initialization again after the restart of the terminal, and performs a binding check of the SIM card and the terminal in the steps 101-107 in an initialization process.

Or, when a data change occurs in the first basic file, the SIM card sends a proactive REFRESH command to the terminal, selects an SIM card initialization mode, triggers the resetting of the SIM card. The SIM performs initialization again after the refresh of the terminal, and performs a binding check of the SIM card and the terminal in the steps 101-107 in the initialization process.

Embodiment Two

Figure 2:
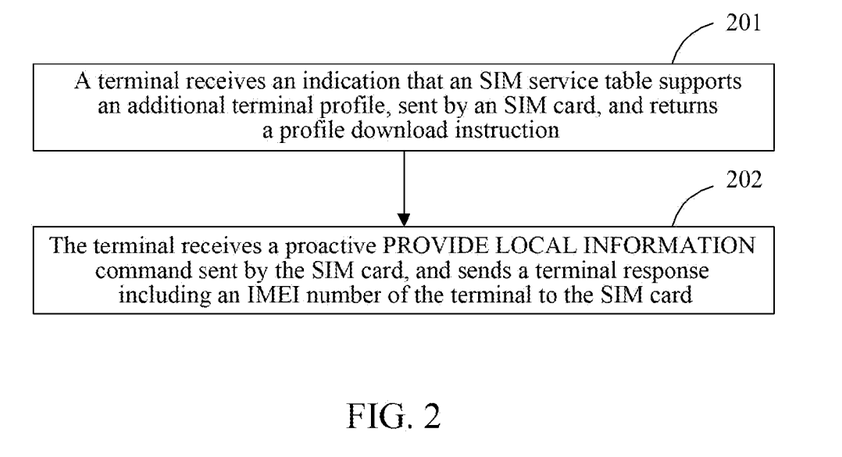
FIG. 2 illustrates a flowchart of a machine-card dynamic binding method implemented by embodiment two of the present document.

Embodiment two of the present document implements a machine-card dynamic binding method. As illustrated in FIG. 2, the method includes the following steps.

In step 201, a terminal receives an indication that an SIM service table supports an additional terminal profile, sent by an SIM card, and returns a profile download instruction.

In step 202, the terminal receives a proactive PROVIDE LOCAL INFORMATION command sent by the SIM card, and sends a terminal response including an IMEI number of the terminal to the SIM card.

Here, the terminal may be ME or IOT equipment which can use the SIM card.

The SIM card is provided in advance with a first basic file and a second basic file. Herein, the first basic file is used for pre-storing an IMEI number/numbers of one or a group of terminals. A read permission of the first basic file is set to be ALWAYS and other permissions are set to be NEVER. The second basic file is used for storing a status flag of a binding check result. The status flag of the binding check result may be a status flag of the binding check result of the SIM card and the terminal at the most recent time, and may also be status flags of binding check results of the SIM card and the terminal at the recent N times, and N is an integer greater than 1. A read permission of the second basic file is set to be ALWAYS, other permissions are set to be NEVER. Besides, the second basic file may also store the IMEI number of the terminal corresponding to the status flag; and the terminal may read the status flag of the binding check result in the second basic file to determine whether binding succeeds.

When the SIM card and the terminal perform an OTA interaction, the terminal judges whether a data change occurs in a first basic file of the SIM card. Restart and reset operations of the terminal are performed if the data change occurs; such that the SIM card performs initialization again after the restart of the terminal, and performs a binding check of the SIM card and the terminal in an initialization process.

Or, when the terminal receives a proactive REFRESH command sent by the SIM card, the terminal performs a refresh operation and triggers resetting of the SIM card, such that the SIM card performs initialization again and performs a binding check of the SIM card and the terminal in the initialization process.

Embodiment Three

Figure 3:
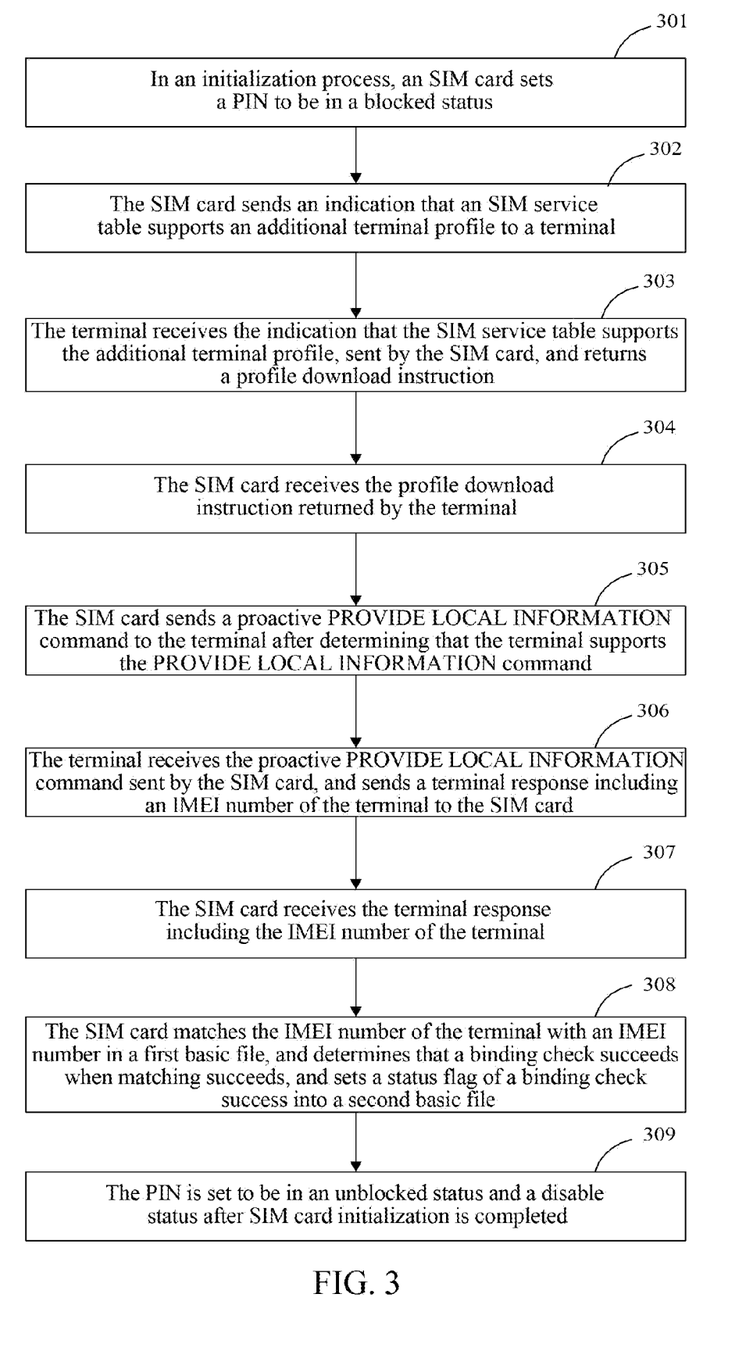
FIG. 3 illustrates a flowchart of a machine-card dynamic binding method implemented by embodiment three of the present document.

Embodiment three of the present document implements a machine-card dynamic binding method. As illustrated in FIG. 3, the method includes the following steps.

In step 301, in an initialization process, an SIM card sets a PIN to be in a blocked status.

In step 302, the SIM card sends an indication that an SIM service table supports an additional terminal profile to a terminal.

In step 303, the terminal receives the indication that the SIM service table supports the additional terminal profile, sent by the SIM card, and returns a profile download instruction.

In step 304, the SIM card receives the profile download instruction returned by the terminal.

In step 305, the SIM card sends a proactive PROVIDE LOCAL INFORMATION command to the terminal after determining that the terminal supports the PROVIDE LOCAL INFORMATION command.

Here, the PROVIDE LOCAL INFORMATION command may be used as a part of an SIM initialization code. The operation of sending the proactive PROVIDE LOCAL INFORMATION command to the terminal includes the following operation. the sending of the proactive PROVIDE LOCAL INFORMATION command is performed through an application program, herein the application program is pre-embedded into the SIM card and may be used as a code of an operating system in the SIM card (i.e., Chip Operating System, COS).

In step 306, the terminal receives the proactive PROVIDE LOCAL INFORMATION command sent by the SIM card, and sends a terminal response including an IMEI number of the terminal to the SIM card.

In step 307, the SIM card receives the terminal response including the IMEI number of the terminal.

In step 308, the SIM card matches the IMEI number of the terminal with an IMEI number in a first basic file, and determines that a binding check succeeds when matching succeeds, and sets a status flag of a binding check success into a second basic file.

Specifically, the SIM card is provided in advance with a first basic file and a second basic file. Herein, the first basic file is used for pre-storing an IMEI number/numbers of one or a group of terminals. A read permission of the first basic file is set to be ALWAYS and other permissions are set to be NEVER. The second basic file is used for storing a status flag of a binding check result. The status flag of the binding check result may be a status flag of the binding check result of the SIM card and the terminal at the most recent time, and may also be status flags of binding check results of the SIM card and the terminal at the recent N times, and N is an integer greater than 1. A read permission of the second basic file is set to be ALWAYS, other permissions are set to be NEVER. Besides, the second basic file may also store the IMEI number of the terminal corresponding to the status flag.

The matching between the IMEI number of the terminal and the IMEI number in the first basic file is performed through a script file. The status flag of the binding check success is set into the second basic file for storage when matching succeeds. The script file is pre-embedded into the SIM card, and may be used as a code of the operating system in the SIM card (i.e., Chip Operating System, COS), and the code has extendibility.

In step 309, the PIN is set to be in an unblocked status and a disable status after SIM card initialization is completed.

In this embodiment, the step 305 further includes the following operation. When the SIM card determines that the terminal does not support the PROVIDE LOCAL INFORMATION command, it is determined that the binding check fails, and the steps after step 305 are not executed any longer.

The step 308 further includes the following operation. When the IMEI number of the terminal is not matched with the IMEI number allowed by the SIM card, it is determined that the binding check fails, and the step after step 308 is not executed any longer. Specifically, when the matching between the IMEI number of the terminal and the IMEI number in the first basic file does not succeed, a status flag of a binding check failure is set into the second basic file for storage.

In the method provided by this embodiment, the SIM card may also accept dynamic management performed by a management platform on the first basic file through an OTA mechanism. The dynamic management includes operations such as an addition operation, a deletion operation and a range change operation are performed on the IMEI numbers stored in the first basic file to implement dynamic binding between the terminal and the SIM. Here, the management platform may be a group of servers.

In addition, the SIM card may provide reading of the status flag of the binding check result in the second basic file for background personnel through the OTA mechanism, such that the background personnel maintains a binding relationship between the SIM card and the terminal.

The method provided by this embodiment further includes the following operations. When the SIM card and the terminal perform an OTA interaction, the terminal judges whether a data change occurs in the first basic file. If the data change occurs, restart and reset operations of the terminal are performed. The SIM card performs initialization again after the restart of the terminal, and performs a binding check of the SIM card and the terminal in the steps 301-309 in an initialization process.

Or, when a data change occurs in the first basic file, the SIM card sends a proactive REFRESH command to the terminal, and selects an SIM card initialization mode, and triggers resetting of the SIM card. The SIM card performs initialization again after the refresh of the terminal and performs a binding check of the SIM card and the terminal in the steps 301-309 in the initialization process.

Embodiment Four

Figure 4:
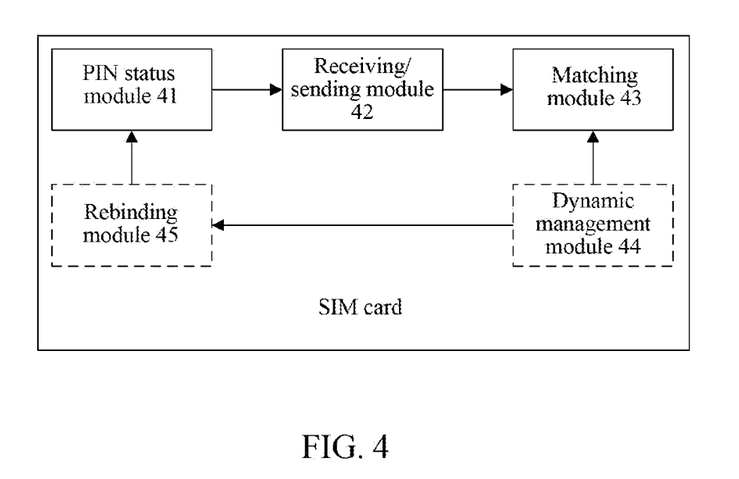
FIG. 4 illustrates a structural schematic diagram of an SIM card implemented by embodiment four of the present document.

In order to implement the method embodiment, embodiment four of the present document provides an SIM card. The SIM card is provided with a first basic file and a second basic file. Herein, the first basic file is used for pre-storing an IMEI number/numbers of one or a group of terminals, and the second basic file is used for storing a status flag of a binding check result. As illustrated in FIG. 4, the SIM card further includes: a PIN status module 41, a receiving/sending module 42 and a matching module 43. Herein, the PIN status module 41 is arranged to, in an initialization process, set a PIN to be in a blocked status and inform the receiving/sending module 42, and set the PIN in an unblocked status and a disable status when determining that a binding check succeeds and initialization is completed;

the receiving/sending module 42 is arranged to indicate that an SIM service table supports an additional terminal profile to a terminal, and receive a profile download instruction, and send a proactive PROVIDE LOCAL INFORMATION command to the terminal after determining that the terminal supports the PROVIDE LOCAL INFORMATION command; and the matching module 43 is arranged to receive a terminal response including an IMEI number of the terminal, match the IMEI number of the terminal with the IMEI number in the first basic file, determine that the binding check succeeds when matching succeeds, and set a status flag of a binding check success into the second basic file, and inform the PIN status module 41 after initialization is completed.

Here, the SIM card generally refers to an SIM card which can use the STK technology and is used for a GSM network, an R-UIM card which can use the STK technology and is used for a CDMA network, or other smart cards which can use the STK technology and are judged by professionals to be capable of being used as SIM cards.

The PROVIDE LOCAL INFORMATION command may be used as a part of an SIM initialization code. The receiving/sending module 42 is specifically arranged to perform the sending of the PROVIDE LOCAL INFORMATION command through an application program. Herein, the application program is pre-embedded into the SIM card and may be used as a code of an operating system in the SIM card.

In this embodiment, the SIM card needs to be provided in advance with a first basic file and a second basic file. Herein, the first basic file is used for pre-storing an IMEI number/numbers of one or a group of terminals. A read permission of the first basic file is set to be ALWAYS and other permissions are set to be NEVER. The second basic file is used for storing a status flag of a binding check result. The status flag of the binding check result may be a status flag of the binding check result of the SIM card and the terminal at the most recent time, and may also be status flag of binding check results of the SIM card and the terminal at the recent N times, and N is an integer greater than 1. A read permission of the second basic file is set to be ALWAYS, other permissions are set to be NEVER. Besides, the second basic file may also store the IMEI number of the terminal corresponding to the status flag.

The matching module 43 is specifically arranged to perform the matching between the IMEI number of the terminal and the IMEI number in the first basic file through a script file. A status flag of a binding check success is set into the second basic file for storage when matching succeeds. The script file is pre-embedded into the SIM card and may be used as a code of the operating system in the SIM card, and the code has extendibility.

The receiving/sending module 42 is further arranged to determine that the binding check fails when determining that the terminal does not support the PROVIDE LOCAL INFORMATION command, and the receiving/sending module 42 is not informed any longer.

The matching module 43 is specifically arranged to, when the IMEI number of the terminal is not matched with the IMEI number allowed by the SIM card, determine that the binding check fails. Specifically, when the matching between the IMEI number of the terminal and the IMEI number in the first basic file does not succeed, the matching module 43 sets a status flag of a binding check failure into the second basic file for storage.

In addition, the SIM card further includes a dynamic management module 44 arranged to accept dynamic management performed by a management platform on the first basic file through an OTA mechanism. The dynamic management includes operations such as an addition operation, a deletion operation and a range change operation are performed on the IMEI numbers stored in the first basic file to implement dynamic binding between the terminal and the SIM. Here, the management platform may be a group of servers.

The dynamic management module 44 is further arranged to provide reading of the status flag of the binding check result in the second basic file for background personnel through the OTA mechanism such that the background personnel maintains a binding relationship between the SIM card and the terminal.

The SIM card may further include a rebinding module 45 arranged to inform the PIN status module 41 after the restart of the terminal; or the rebinding module 45 is arranged to, when a data change occurs in the first basic file, send a proactive REFRESH command to the terminal, select an SIM card initialization mode, and trigger resetting of the SIM card, and inform the PIN status module 41 after the refresh of the terminal.

Embodiment Five

Figure 5:
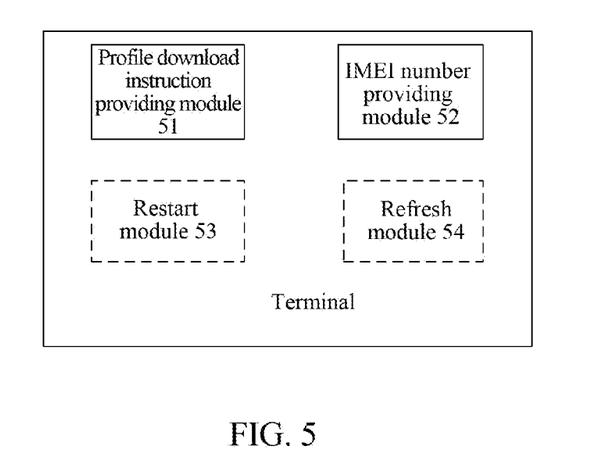
FIG. 5 illustrates a structural schematic diagram of a terminal implemented by embodiment five of the present document.

In order to implement the method embodiment, embodiment five of the present invention provides a terminal. As illustrated in FIG. 5, the terminal includes: a profile download instruction providing module 51 and an IMEI number providing module 52. Herein, the profile download instruction providing module 51 is arranged to receive an indication that an SIM service table supports an additional terminal profile, sent by the SIM card, and return a profile download instruction; and the IMEI number providing module 52 is arranged to receive a proactive PROVIDE LOCAL INFORMATION command sent by the SIM card, and send a terminal response including an IMEI number of the terminal to the SIM card.

In another example of this embodiment, the terminal further includes a restart module 53 arranged to judge whether a data change occurs in a first basic file of the SIM card, and perform restart and reset operations of the terminal if the data change occurs, such that the SIM card performs initialization again after the restart of the terminal, and performs a binding check of the SIM card and the terminal in an initialization process. The SIM card is provided with the first basic file and a second basic file. Herein, the first basic file is used for pre-storing an IMEI number/numbers of one or a group of terminals, and the second basic file is used for storing a status flag of a binding check result.

In another example of this embodiment, the terminal further includes a refresh module 54 arranged to, when receiving a proactive REFRESH command sent by the SIM card, perform a refresh operation and trigger resetting of the SIM card, such that the SIM card performs initialization again, and performs a binding check of the SIM card and the terminal in an initialization process.

Embodiment Six

Figure 6:
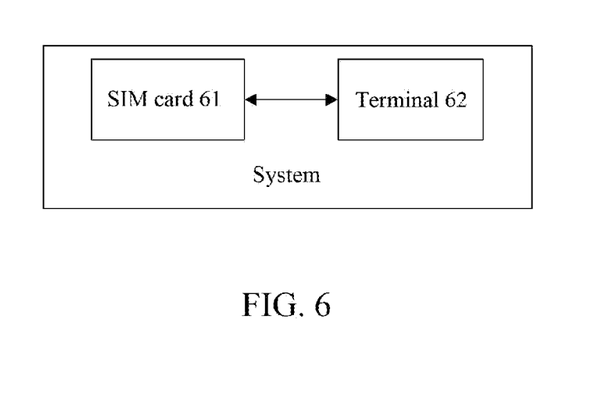
FIG. 6 illustrates a structural schematic diagram of a machine-card dynamic binding system implemented by embodiment six of the present document.

In order to implement the method embodiment, embodiment six of the present document further provides a machine-card dynamic binding system. As illustrated in FIG. 6, the machine-card dynamic binding system includes an SIM card 61 and a terminal 62. Herein, the SIM card is provided with a first basic file and a second basic file. Herein, the first basic file is used for pre-storing an IMEI number/numbers of one or a group of terminals, the second basic file is used for storing a status flag of a binding check result. Besides, the second basic file may also store an IMEI number of the terminal corresponding to the status flag.

The SIM card 61 is arranged to, in an initialization process, set a PIN to be in a blocked status, indicate that an SIM service table supports an additional terminal profile to the terminal, receive a profile download instruction, send a proactive PROVIDE LOCAL INFORMATION command to the terminal after determining that the terminal supports the PROVIDE LOCAL INFORMATION command, receive a terminal response including an IMEI number of the terminal, match the IMEI number of the terminal with the IMEI number in the first basic file, determine that a binding check succeeds when matching succeeds, set a status flag of a binding check success into the second basic file, and set the PIN to be in an unblocked status and a disable status after SIM card initialization is completed.

The terminal 62 is arranged to receive an indication that the SIM service table supports the additional terminal profile, sent by the SIM card, and return the profile download instruction; and receive the proactive PROVIDE LOCAL INFORMATION command sent by the SIM card, and send the terminal response including the IMEI number of the terminal to the SIM card.

The SIM card 61, as illustrated in FIG. 4, includes: a PIN status module 41, a receiving/sending module 42 and a matching module 43. Herein, the PIN status module 41 is arranged to, in an initialization process, set a PIN to be in a blocked status, inform the receiving/sending module 42 and set the PIN in an unblocked status and a disable status when determining that a binding check succeeds and initialization is completed;

the receiving/sending module 42 is arranged to indicate that an SIM service table supports an additional terminal profile to a terminal, receive a profile download instruction, send a proactive PROVIDE LOCAL INFORMATION command to the terminal after determining that the terminal supports the PROVIDE LOCAL INFORMATION command, and receive a terminal response including an IMEI number of the terminal; and the matching module 43 is arranged to match the IMEI number of the terminal with the IMEI number in the first basic file, determine that the binding check succeeds when matching succeeds, and inform the PIN status module 41 after initialization is completed.

The terminal 62, as illustrated in FIG. 5, includes: a profile download instruction providing module 51 and an IMEI number providing module 52, herein, the profile download instruction providing module 51 is arranged to receive an indication that an SIM service table supports an additional terminal profile, sent by the SIM card, and return a profile download instruction; and the IMEI number providing module 52 is arranged to receive a proactive PROVIDE LOCAL INFORMATION command sent by the SIM card, and send a terminal response including an IMEI number of the terminal to the SIM card.

The embodiments described above are just alternative embodiments of the present document and are not used for limiting the protection scope of the present document. Any modification, equivalent replacement, improvement and the like made within the essence and rule of the present document shall be included in the protection scope of the present document.

What is claimed is:

1. A machine-card dynamic binding method, comprising:
providing a first basic file and a second basic file on a Subscriber Identification Module, SIM, card, wherein the first basic file is used for pre-storing an International Mobile Equipment Identity, IMEI, number/numbers of one or a group of terminals, and the second basic file is used for storing a status flag of a binding check result;

setting, by the SIM card, a Personal Identification Number, PIN, to be in a blocked status in an initialization process, sending an indication, which indicates that an SIM service table supports an additional terminal profile, to a terminal, and receiving a profile download instruction;

sending, by the SIM card, a proactive PROVIDE LOCAL INFORMATION command to the terminal after determining that the terminal supports the PROVIDE LOCAL INFORMATION command, and receiving a terminal response including an IMEI number of the terminal; and matching, by the SIM card, the IMEI number with the IMEI number in the first basic file, and determining that a binding check succeeds if matching succeeds, and setting a status flag of a binding check success into the second basic file, and setting the PIN to be in an unlocked status and a disable status after SIM card initialization is completed;

wherein the method further comprises: when the SIM card and the terminal perform an OTA interaction, the terminal determining that a data change occurs in the first basic file, performing restart and reset operations of the terminal, the SIM card performing initialization again after the restart of the terminal, and performing a binding check of the SIM card and the terminal in an initialization process;

or, when a data change occurs in the first basic file, the SIM card sending a proactive REFRESH command to the terminal, selecting an SIM card initialization mode, triggering resetting of the SIM card, performing initialization again after the refresh of the terminal, and performing a binding check of the SIM card and the terminal in an initialization process.

2. The machine-card dynamic binding method according to claim 1, wherein the PROVIDE LOCAL INFORMATION command is used as a part of an SIM initialization code.

3. The machine-card dynamic binding method according to claim 1, wherein said sending a proactive PROVIDE LOCAL INFORMATION command to the terminal comprises: performing the sending of the proactive PROVIDE LOCAL INFORMATION command through an application program, wherein the application program is pre-embedded into the SIM card and used as a code of an operating system in the SIM card.

4. The machine-card dynamic binding method according to claim 1, wherein the SIM card matching the IMEI number with the IMEI number in the first basic file comprises: performing the matching between the IMEI number of the terminal and the IMEI number in the first basic file through a script file.

5. The machine-card dynamic binding method according to claim 4, wherein the script file is pre-embedded into the SIM card and used as a code of an operating system in the SIM card.

6. The machine-card dynamic binding method according to claim 1, wherein the method further comprises: the SIM card accepting dynamic management performed by a management platform on the first basic file through an OTA mechanism.

7. The machine-card dynamic binding method according to claim 1, wherein the method further comprises: the SIM card providing reading of the status flag of the binding check result in the second basic file for background personnel through an OTA mechanism.

8. A machine-card dynamic binding method, comprising:
a terminal receiving an indication, which indicates that an SIM service table supports an additional terminal profile, sent by an SIM card, and returning a profile download instruction; and
the terminal receiving a proactive PROVIDE LOCAL INFORMATION command sent by the SIM card, and sending a terminal response including an IMEI number of the terminal to the SIM card;
wherein the IMEI number of the terminal indicates the SIM card to match the IMEI number of the terminal with a pre-stored IMEI number in the SIM card; if matching succeeds, a binding check is determined be successful;
wherein the method further comprises: when the SIM card and the terminal perform an OTA interaction, the terminal determining that a data change occurs in a first basic file of the SIM card, performing restart and reset operations of the terminal, and indicating the SIM card to perform initialization again after the restart of the terminal, and perform a binding check of the SIM card and the terminal in an initialization process; wherein the first basic file is used for pre-storing an IMEI number/numbers of one or a group of terminals;

or, when the pre-stored IMEI number in the SIM card is changed, the terminal receiving a proactive REFRESH command from the SIM card, performing a refresh operation and triggering resetting of the SIM card; the SIM card selecting an SIM card initialization mode, performing initialization again after the refresh of the terminal, and performing a binding check of the SIM card and the terminal in an initialization process.

9. The machine-card dynamic binding method according to claim 8, wherein the SIM card is further provided with a second basic file, wherein the second basic file is used for storing a status flag of a binding check result.

10. A machine-card dynamic binding method, comprising:
providing a first basic file and a second basic file on an SIM card, wherein the first basic file is used for pre-storing an IMEI number/numbers of one or a group of terminals, and the second basic file is used for storing a status flag of a binding check result;
the SIM card setting a PIN to be in a blocked status in an initialization process, and sending an indication, which indicates that an SIM service table supports an additional terminal profile to a terminal;
the terminal receiving the indication sent by the SIM card, and returning a profile download instruction;
the SIM card receiving the profile download instruction, and sending a proactive PROVIDE LOCAL INFORMATION command to the terminal after determining that the terminal supports the PROVIDE LOCAL INFORMATION command;
the terminal receiving the proactive PROVIDE LOCAL INFORMATION command sent by the SIM card, and sending a terminal response including an IMEI number of the terminal to the SIM card; and
the SIM card matching the IMEI number of the terminal with the IMEI number in the first basic file, and determining that a binding check succeeds when matching succeeds, and setting a status flag of a binding check success into the second basic file, and setting the PIN to be in an unblocked status and a disable status after SIM card initialization is completed;
wherein the method further comprises: when the SIM card and the terminal perform an OTA interaction, the terminal determining that a data change occurs in the first basic file, performing restart and reset operations of the terminal, the SIM card performing initialization again after the restart of the terminal, and performing a binding check of the SIM card and the terminal in an initialization process;

or, when a data change occurs in the first basic file, the SIM card sending a proactive REFRESH command to the terminal, selecting an SIM card initialization mode, triggering resetting of the SIM card, performing initialization again after the refresh of the terminal, and performing a binding check of the SIM card and the terminal in an initialization process.

11. An SIM card provided with a first basic file and a second basic file, wherein the first basic file is used for pre-storing an IMEI number/numbers of one or a group of terminals, and the second basic file is used for storing a status flag of a binding check result;
the SIM card further comprising: a PIN status module, a receiving/sending module, and a matching module and a rebinding module, wherein, the PIN status module is arranged to, in an initialization process, set a PIN to be in a blocked status, and inform the receiving/sending module, and set the PIN in an unblocked status and a disable status when determining that a binding check succeeds and initialization is completed;

the receiving/sending module is arranged to send an indication, which indicates that an SIM service table supports an additional terminal profile, to a terminal, and receive a profile download instruction, and send a proactive PROVIDE LOCAL INFORMATION command to the terminal after determining that the terminal supports the PROVIDE LOCAL INFORMATION command; and the matching module is arranged to receive a terminal response including an IMEI number of the terminal, and match the IMEI number of the terminal with the IMEI number in the first basic file, and determine that the binding check succeeds when matching succeeds, and set a status flag of a binding check success into the second basic file, and inform the PIN status module after the initialization is completed;

the rebinding module is arranged to send a proactive REFRESH command to the terminal, select an SIM card initialization mode, trigger resetting of the SIM card, perform initialization again after the refresh of the terminal, and perform a binding check of the SIM card and the terminal in an initialization process, when a data change occurs in the first basic file;

or the rebinding module is arranged to perform initialization again after the restart of the terminal, and perform a binding check of the SIM card and the terminal in an initialization process; wherein the terminal restarts after the terminal determines that the data change occurs in the first basic file when the SIM card and the terminal perform an OTA interaction.

12. The SIM card according to claim 11, wherein the PROVIDE LOCAL INFORMATION command is used as a part of an SIM initialization code.

13. The SIM card according to claim 11, wherein the receiving/sending module is arranged to perform the sending of the PROVIDE LOCAL INFORMATION command through an application program, wherein the application program is pre-embedded into the SIM card and used as a code of an operating system in the SIM card;

and, the matching module is arranged to perform the matching between the IMEI number of the terminal and the IMEI number in the first basic file through a script file.

14. The SIM card according to claim 13, wherein the SIM card further comprises: a dynamic management module arranged to accept dynamic management performed by a management platform on the first basic file through an OTA mechanism;

and, wherein the dynamic management module is further arranged to provide reading of the status flag of the binding check result in the second basic file for background personnel through the OTA mechanism.

15. A terminal, comprising: a profile download instruction providing module and an IMEI number providing module, wherein, the profile download instruction providing module is arranged to receive an indication, which indicates that an SIM service table supports an additional terminal profile, sent by an SIM card, and return a profile download instruction; and the IMEI number providing module is arranged to receive a proactive PROVIDE LOCAL INFORMATION command sent by the SIM card, and send a terminal response including an IMEI number of the terminal to the SIM card;

wherein the IMEI number of the terminal indicates the SIM card to match the IMEI number of the terminal with a pre-stored IMEI number in the SIM card; if matching succeeds, a binding check is determined be successful;

wherein the terminal further comprises a restart module, which is arranged to determine that a data change occurs in a first basic file of the SIM card, and perform restart and reset operations of the terminal, when the SIM card and the terminal perform an OTA interaction; wherein the first basic file is a file in the SIM card, and is used for pre-storing an IMEI number/numbers of one or a group of terminals; and after the restart of the terminal, the SIM card performs initialization again and performs a binding check of the SIM card and the terminal in an initialization process;

or, the terminal further comprises a refresh module, which is arranged to, when receiving a proactive REFRESH command sent by the SIM card, perform a refresh operation and trigger resetting of the SIM card; wherein the SIM card performs initialization again after the refresh of the terminal, and performs a binding check of the SIM card and the terminal in an initialization process.

16. A machine-card dynamic binding system, comprising an SIM card and a terminal, wherein the SIM card is provided with a first basic file and a second basic file, wherein the first basic file is used for pre-storing an IMEI number/numbers of one or a group of terminals, and the second basic file is used for storing a status flag of a binding check result;

the SIM card is arranged to, in an initialization process, set a PIN to be in a blocked status, send an indication, which indicates that an SIM service table supports an additional terminal profile, to a terminal, receive a profile download instruction, send a proactive PROVIDE LOCAL INFORMATION command to the terminal after determining that the terminal supports the PROVIDE LOCAL INFORMATION command, receive a terminal response including an IMEI number of the terminal, match the IMEI number of the terminal with the IMEI number in the first basic file, determine that a binding check succeeds when matching succeeds, set a status flag of a binding check success into the second basic file, and set the PIN to be in an unblocked status and a disable status after SIM card initialization is completed; and the terminal is arranged to receive the indication sent by the SIM card, and return the profile download instruction; and receive the proactive PROVIDE LOCAL INFORMATION command sent by the SIM card, and send the terminal response including the IMEI number of the terminal to the SIM card;

when the SIM card and the terminal perform an OTA interaction, the terminal is further arranged to determine that a data change occurs in the first basic file, perform restart and reset operations of the terminal, the SIM card is further arranged to perform initialization again after the restart of the terminal, and perform a binding check of the SIM card and the terminal in an initialization process;

or, when a data change occurs in the first basic file, the SIM card is further arranged to send a proactive REFRESH command to the terminal, select an SIM card initialization mode, trigger resetting of the SIM card, perform initialization again after the refresh of the terminal, and perform a binding check of the SIM card and the terminal in an initialization process.

* * * * *